June 28, 1966  R. E. PHELON ETAL  3,258,623
ROTOR FOR AN ELECTRIC GENERATOR

Filed May 2, 1963  7 Sheets-Sheet 1

INVENTORS
RUSSELL E. PHELON
WILLIAM O. HENSCHKE

BY Teller & McCormick

ATTORNEYS

June 28, 1966 R. E. PHELON ETAL 3,258,623
ROTOR FOR AN ELECTRIC GENERATOR
Filed May 2, 1963 7 Sheets-Sheet 2
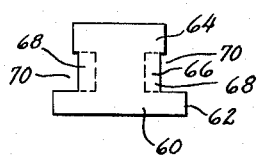
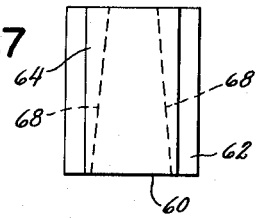
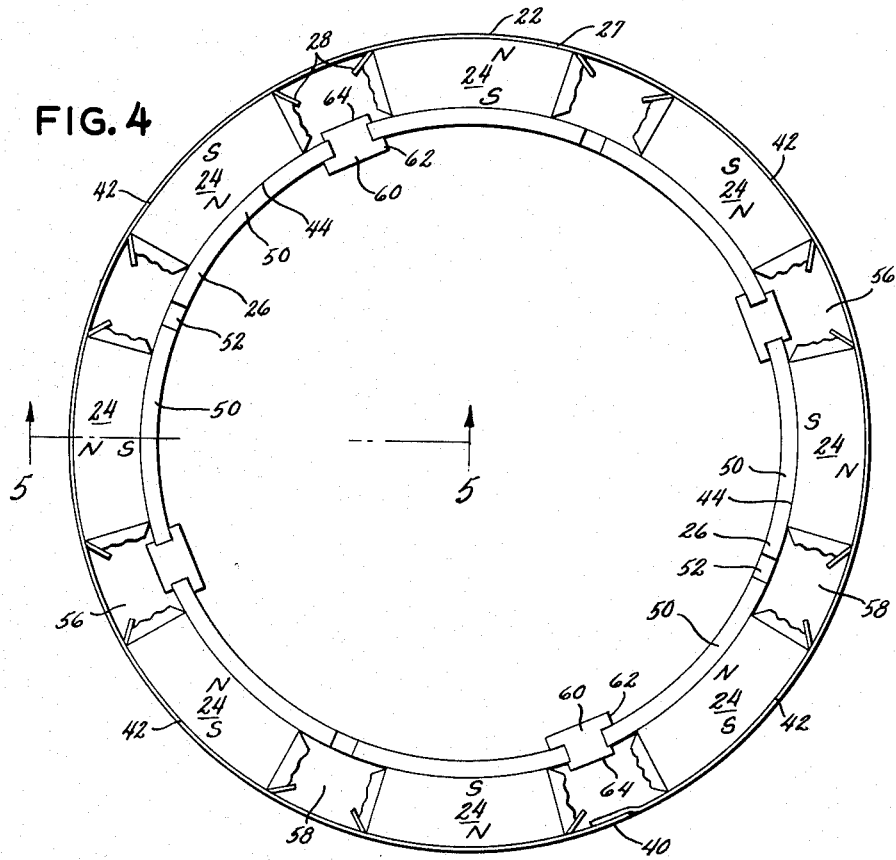
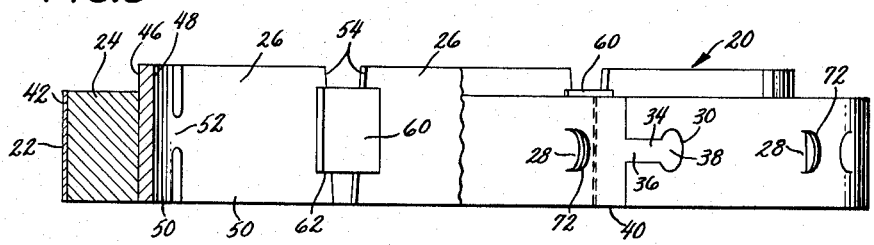

FIG. 8
FIG. 12
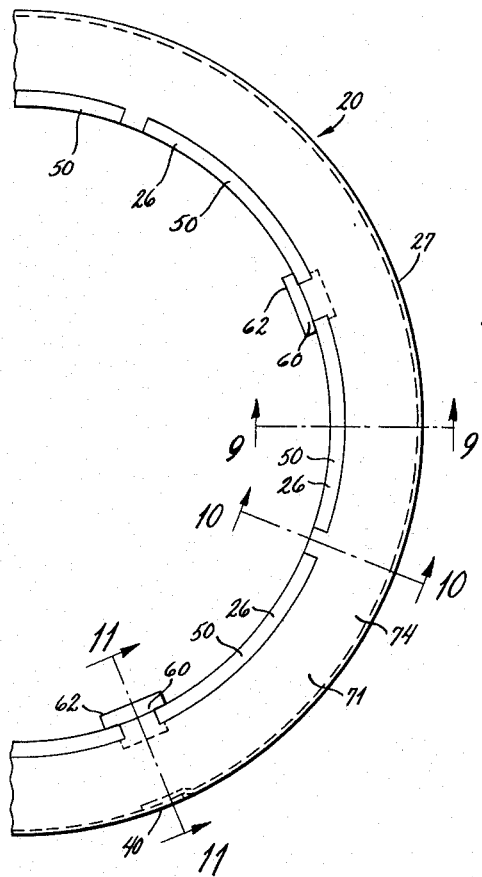
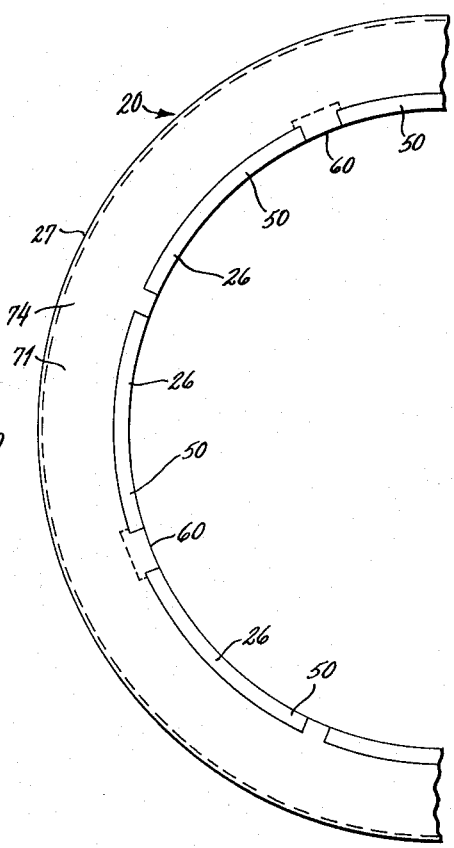
FIG. 9
FIG. 10
FIG. 11
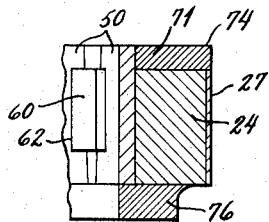
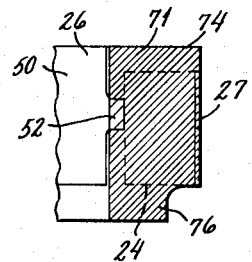
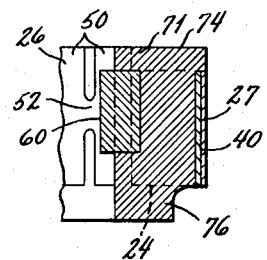

June 28, 1966 R. E. PHELON ETAL 3,258,623
ROTOR FOR AN ELECTRIC GENERATOR
Filed May 2, 1963 7 Sheets-Sheet 5

June 28, 1966 R. E. PHELON ET AL 3,258,623
ROTOR FOR AN ELECTRIC GENERATOR
Filed May 2, 1963 7 Sheets-Sheet 6

United States Patent Office 3,258,623
Patented June 28, 1966

3,258,623
ROTOR FOR AN ELECTRIC GENERATOR
Russell E. Phelon, Rio Piedras, Puerto Rico, and William O. Henschke, Longmeadow, Mass., assignors to R. E. Phelon Company, Inc., East Longmeadow, Mass., a corporation of Massachusetts
Filed May 2, 1963, Ser. No. 277,982
16 Claims. (Cl. 310—156)

This invention relates to electric generators of the flywheel type and deals more particularly with a rotor for such a generator and to a method for making the same. This application is a continuation-in-part application based on the prior application of Phelon et al., Serial No. 23,316, filed April 19, 1960.

In the type of generator with which this invention is concerned, the field structure is the rotating member and comprises an annular rotor assembly of permanent magnets and pole pieces carried by the flywheel of the engine with which a generator is associated. The rotor is made by first assembling the magnets and pole pieces in the required annular relationship and thereafter embedding the assembly in a body of nonmagnetic material, such as aluminum, by die casting the nonmagnetic material around the assembled parts. The annulus thus formed may consist of an insert adapted for connection by press fitting or mechanicacl fasteners to a separate flywheel, or may be integrally attached to the flywheel, the latter also being cast from the nonmagnetic material during the die casting operation. The construction and the method of this invention are primarily suited to the manufacture of a rotor annulus for use with a separate flywheel; however, they are not necessarily limited to this application and may be used as well, at least in their broader aspects, in the manufacture of an integral rotor and flywheel.

The general object of this invention is to provide an improved method and means for assembling the magnets and pole pieces of a flywheel type rotor into their required annular relationship prior to the die casting operation and for mechanically holding them in such relationship as a rigid supporting annulus that will not fall apart as the annulus is transported to the die casting machine, placed in the machine, or handled in any other ordinary manner.

A further object of this invention is to provide a simple method and means for rapidly placing the individual magnets in their proper circumaxially spaced positions as the rotor is assembled and for holding them in these positions after assembly.

A further object of this invention is to provide an improved method and means for holding the outside diameter of the finished rotor annulus within relatively close tolerances, thereby facilitating its connection, as by press fitting or other means, to a separate flywheel of given size.

A still further object of this invention is to provide a rotor construction having a smaller number of parts than previous constructions, and which includes a partial short circuit for magnetic flux between pairs of adjacent magnetic poles, which short circuit aids in maintaining the magnetization of the magnets and in reducing the effect of the armature reaction flux produced when the armature is carrying a useful load current.

Another object of this invention is to provide a rotor annulus having an outer annular band which is firmly anchored to the die cast material so as not to come loose during subsequent machining operations.

This invention is also in some respects related to my prior application Serial Number 843,172, filed September 29, 1959, which pertains to a generator rotor of the flywheel type having tangentially charged magnets. The rotor of this invention, however, employs radially charged magnets and differs from that of my prior application by various novel features in both the structural details and the method of assembly.

The drawings show preferred embodiments of the invention and such embodiments will be described, but it will be understood that various changes may be made from the constructions disclosed, and that the drawings and descriptions are not to be construed as defining or limiting the scope of the invention, the claims forming a part of this specification being relied upon for that purpose.

Of the drawings:

FIG. 1 is a plan view of a partially assembled rotor annulus made in accordance with this invention, FIG. 2 is a partly sectional and partly elevational view of the annulus as shown in FIG. 1, the sectional portion of the view being taken on the line 2—2 of FIG. 1, FIG. 3 is a fragmentary plan view of the strip employed in making the outer band of the annulus as shown in FIG. 1, FIG. 4 is a plan view similar to FIG. 1, but with the annulus shown in a further state of assembly, FIG. 5 is a partly sectional and partly elevational view of the annulus as shown in FIG. 1, the sectional portion of the view being taken on the line 5—5 of FIG. 4.

FIG. 6 is a top view of a wedge element used in the assembly of FIG. 4,

FIG. 7 is a side view of the wedge element shown in FIG. 6,

Figure 13:
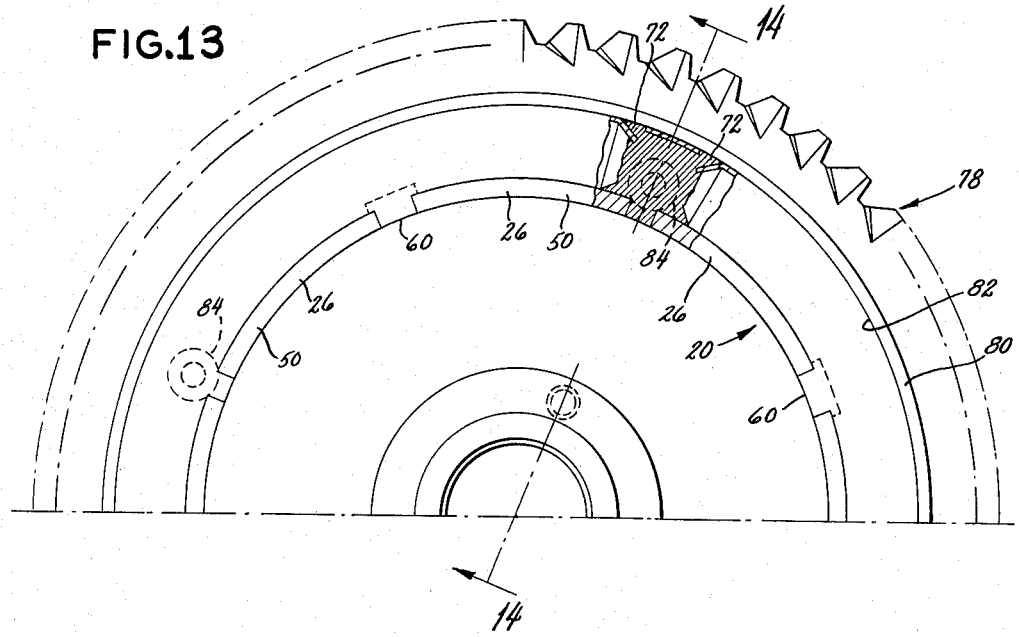
Figure 14:
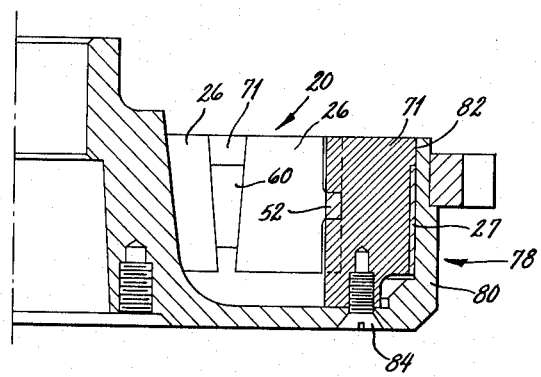
Figure 17:
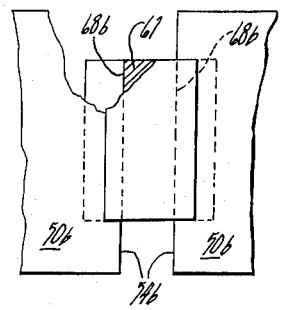
Figure 15:
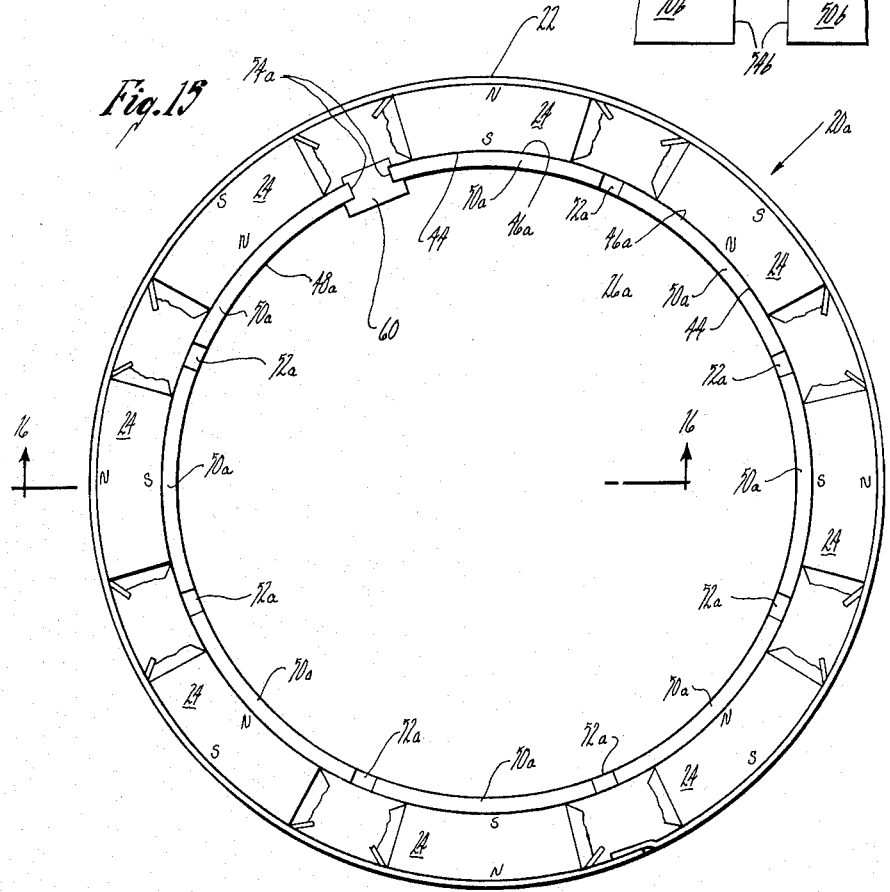
Figure 16:
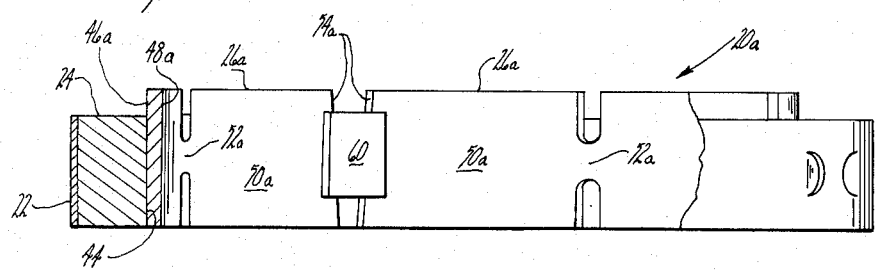
Figure 20:
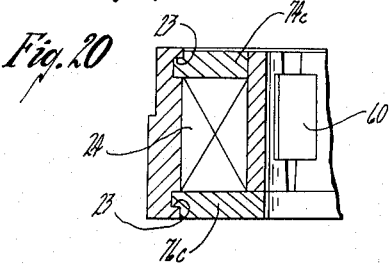
Figure 18:
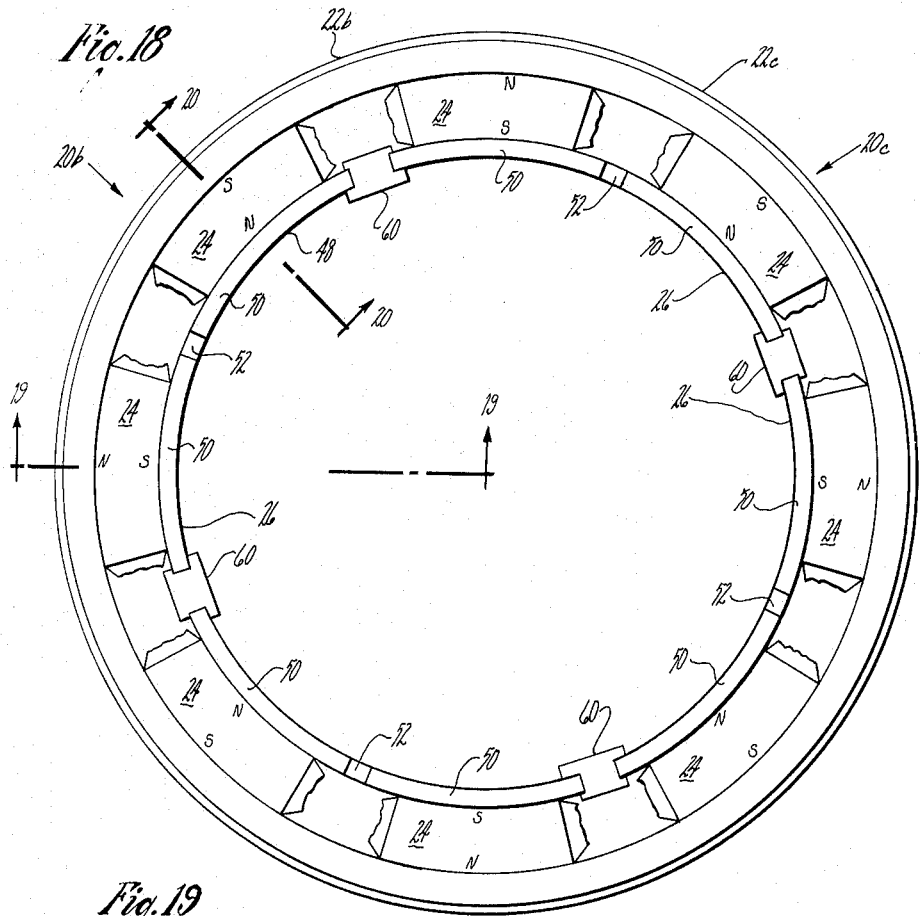
Figure 19:
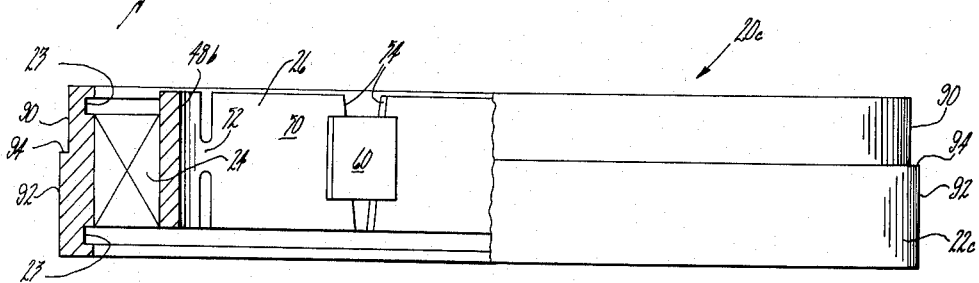
Figure 21:
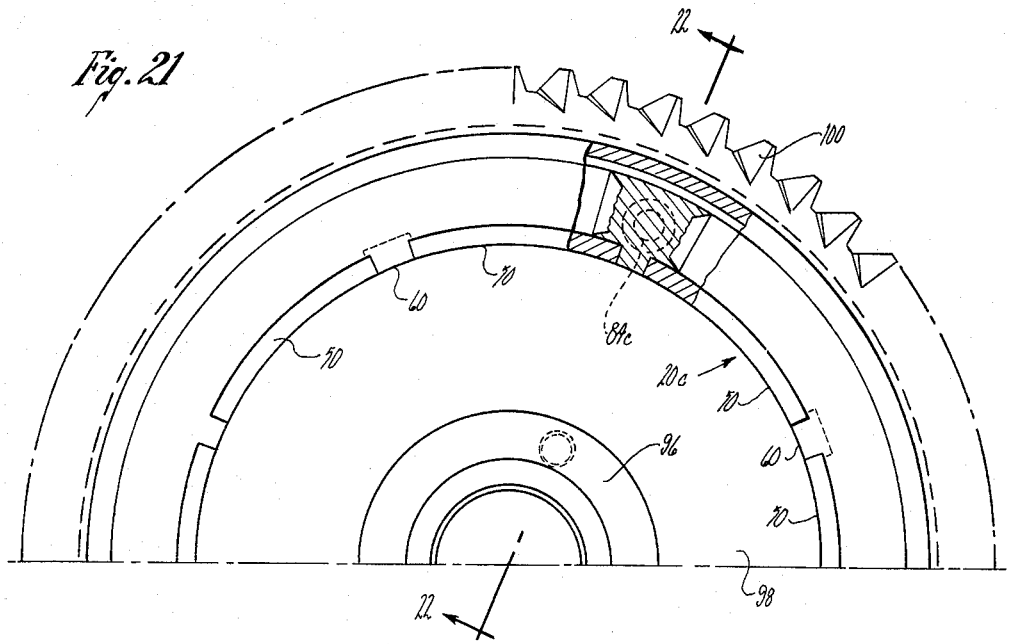
Figure 22:
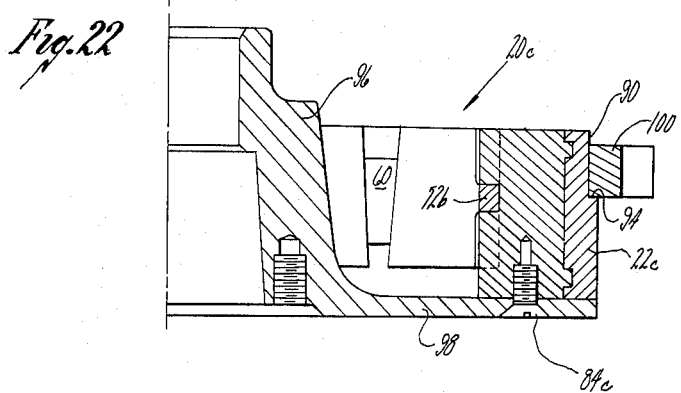

FIG. 8 is a fragmentary plan view showing the annulus immediately after the die casting operation, FIG. 9 is a vertical sectional view taken on the line 9—9 of FIG. 8, FIG. 10 is a vertical sectional view taken on the line 10—10 of FIG. 8, FIG. 11 is a vertical sectional view taken on the line 11—11 of FIG. 8, FIG. 12 is a fragmentary plan view showing the annulus in its completed form, FIG. 13 is a fragmentary plan view showing the annulus fitted into a flywheel, FIG. 14 is a vertical sectional view taken on the line 14—14 of FIG. 13, FIG. 15 is a plan view of an annulus in the same state of assembly as that of FIG. 4, but showing an alternative embodiment of the annulus which embodiment uses only a single wedge, FIG. 16 is a partly sectional and partly elevational view of the annulus as shown in FIG. 15, the sectional portion of the view being taken on the line 16—16 of FIG. 15, FIG. 17 is an enlarged side view of a spacer element which may be employed in an alternative embodiment of the invention, the spacer being shown in assembled condition with two adjacent pole shoes and being shown partially broken away, FIG. 18 is a plan view of an annulus in the same state of assembly as that of FIG. 4, but showing still another alternative embodiment using a heavy or thick tubular band as the annular restraining member, FIG. 19 is a partly sectional and partly elevational view of the annulus shown in FIG. 18, the sectional portion of the view being taken on the line 19—19 of FIG. 18, FIG. 20 is a vertical sectional view taken on the line 20—20 of FIG. 18, but showing the annulus as it appears after the die casting operation, FIG. 21 is a fragmentary plan view showing the annulus of FIG. 18 in completed condition, and FIG. 22 is a vertical sectional view taken on the line 22—22 of FIG. 21.

Figure 1:
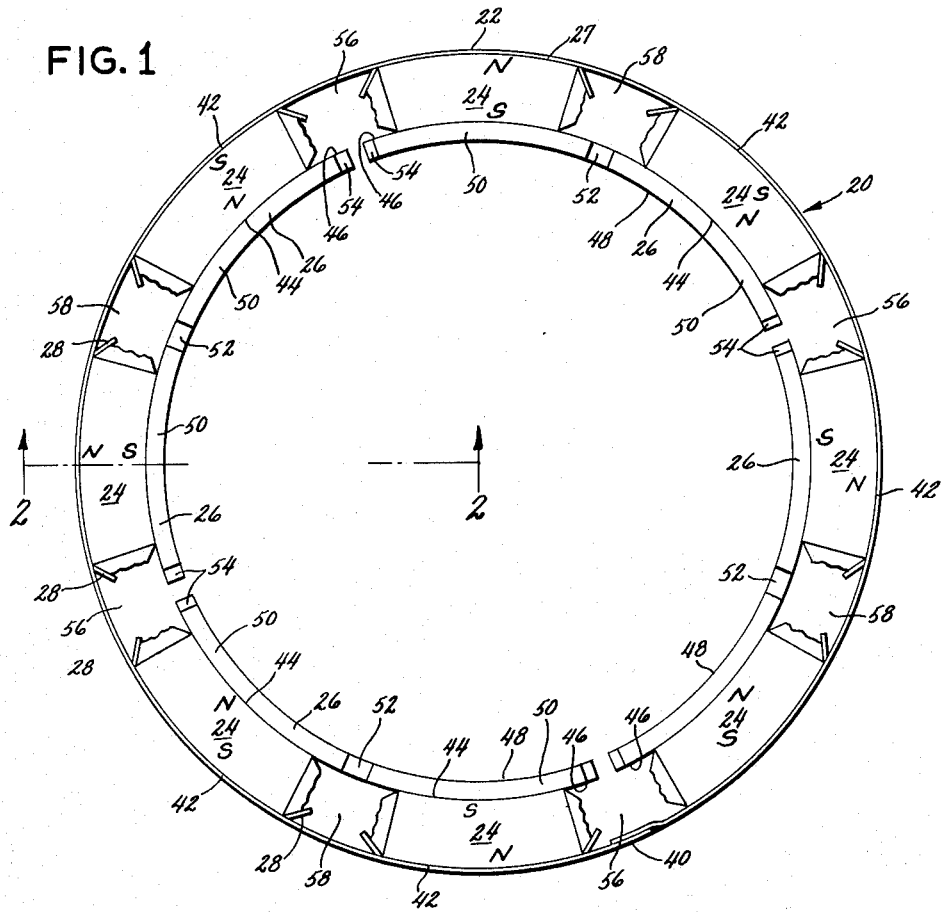
Figure 2:
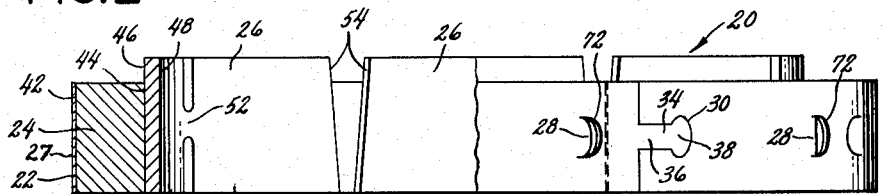
Figure 3:
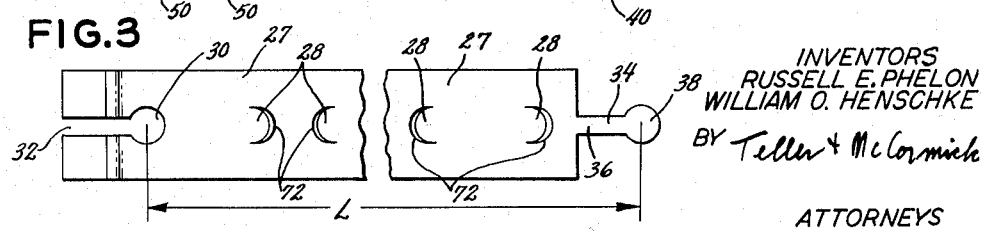

Referring first to FIGS. 1 and 2, there is shown a partially completed rotor annulus 20 comprising a plurality of separate parts arranged in accordance with a method of this invention into an initial state of assembly. The annulus 20 includes an outer annular restraining member 22, a plurality of magnets 24, 24 arranged in a circumaxially spaced annular series within the annular member 22, and a plurality of pole pieces 26, 26 arranged in a circumaxially spaced annular series within the annular series of magnets 24, 24. As shown, the annular restraining member 22 comprises an annular band 27 formed from a thin generally flexible strip of magnetic material and provided with circumaxially spaced pairs of circumaxially spaced abutments or tabs 28, 28 struck inwardly from the body of the band 27. The strip from which the annular band 27 is made is shown in FIG. 3. Preferably, this strip has at one end portion a circular opening 30 and a slot 32 communicating with the opening and extending from the opening to the adjacent end edge of the strip. The other end of the strip is provided with a tongue 34 having a shank portion 36 and a head portion 38 conforming respectively in size and shape with the slot 32 and opening 30 in the first end portion of the strip. The strip is preferably blanked or otherwise cut from sheet stock so that the length L between the center of the opening 30 and the center of the head 38 is held to a close tolerance. In making the band, the strip is closed upon itself and the head 38 fitted into the opening 30, as shown in FIG. 2, with the result that the circumference and diameter of the band are held to close tolerances. As shown in FIGS. 1 and 2, portions of the ends of the strip are overlapped, as at 40, and the resulting band is welded at this overlap to provide a strong joint, the fit between the tongue 34 and the opening 30 and slot 32 serving primarily as a means for accurately locating the ends of the strip relative to each other rather than as a mechanical joint.

The magnets 24, 24 are arcuate in shape, having outer faces 42, 42 which fit with and engage the inner face of the band 27, and having inner faces 44, 44 concentric with the central axis of the band 27. The annulus includes an even number of magnets, and in the illustrated case, includes a total of 8 magnets, although the total number is not important to the invention and may vary. The magnets are capable of being radially charged after a suitable flux path is provided between them, and preferably the charging is done after the completed annulus is assembled with a flywheel having a rim of magnetic material that provides for the flux path between the magnets. When the magnets are charged, they are charged in opposite directions so that the inner faces 44, 44 of immediately adjacent magnets comprise a pair of north and south magnetic poles, and so that the north poles alternate with the south poles around the surface circumscribed by the inner faces 44, 44 of the magnets.

The pole pieces 26, 26 are also arcuate in shape and have outer faces 46, 46, which fit with and engage the inner faces 44, 44 of the magnets, and inner faces 48, 48 concentric with the central axis of the annulus. Each pole piece 26 is associated with the inner faces 44, 44 of two immediately adjacent magnets, and as shown in FIGS. 1 and 2, includes two shoe portions 50, 50 of relatively large cross-sectional area and an intermediate portion 52 of relatively small cross-sectional area. Each shoe portion engages a respective one of the two magnets associated with the pole piece and extends for some distance circumaxially beyond both ends of its associated magnet, the intermediate portion 52 which connects the two shoe portions being located substantially midway between the opposed ends of the two associated magnets. At least one end face 54, and preferably both of the end faces 54, 54 of each pole piece is disposed at an inclined angle with respect to the side edges of the pole piece, and the pole pieces are so arranged that the adjacent end faces 54, 54 of adjacent pole pieces 26, 26 diverge axially in one direction. That is, as shown best in FIG. 2, the adjacent end faces 54, 54 of adjacent pole pieces 26, 26 are arranged so as to be more closely spaced to each other adjacent the bottom portion of the annulus than at the upper portion of the annulus so as to leave a wedge-shaped space between adjacent pole pieces. The pairs of adjacent end faces 54, 54 defined by the pole pieces 26, 26 as shown in FIG. 1, are located respectively adjacent alternate spaces 56, 56 between adjacent magnets 24, 24, with the intermediate portions 52, 52 of the pole pieces being located adjacent the other alternate spaces 58, 58 between adjacent magnets.

In the illustrated annulus of FIG. 2, the magnets 24, 24 and the band 27 are of the same axial width, which width is less than the axial width of the pole pieces 26, 26 and the bottom edges of the band, the magnets and the pole pieces, as viewed in FIG. 2, are aligned in the same radial plane so that the upper portions of the pole pieces project axially beyond the top edges of the magnets and the band. It is to be understood, however, that the relative widths and axial relationship of these parts is not critical and that the relative widths and axial relationship may vary from those shown without departing from the invention.

At this point, it might be noted that the intermediate portions 52, 52 of the pole pieces 26, 26 serve several purposes. First of all, they mechanically connect the two shoe portions of the pole pieces and thereby reduce the total number of pole pieces required for the annulus, it having been customary in the past to provide a separate pole piece or shoe for each magnet. The reduction of the number of pole pieces also reduces the number of wedges or other elements, later to be described, required for holding together the pole pieces, and thereby in addition, reduces the time and labor required for applying these elements. Secondly, the intermediate portions 52, 52 serve to provide a path for the flow of a limited amount of magnetic flux between the two associated shoe portions. These magnetic connections are not detrimental to the performance of the finished rotor, but actually have been found to be of advantage in two respects. The leakage of magnetic flux across the paths formed by these magnetic connections aids in maintaining the magnets at a high state of magnetization until the annulus is ultimately used in the assembly of a completed generator. In this case, the intermediate portions act in a way similar to a keeper often used in the past in connection with other magnetic devices to aid in the prevention of loss of magnetization. Also, when the annulus is used in a generator the intermediate portions 52, 52 serve as partial short circuits for the reactive magnetic flux produced by the stator or armature of the machine when the latter is carrying a useful load current and thereby serve to reduce the generally undesirable armature reaction effect.

The assembly of the parts shown in FIGS. 1 and 2 is preferably carried out on a flat table. The closed band 27 is first placed on the table and then the several magnets 24, 24 are arranged within the band at their proper circumaxial location by fitting them between the tabs 28, 28 comprising the circumaxially spaced pairs of tabs. Each magnet 24 therefore has associated with it two tabs 28 which engage respectively the ends of the magnet and restrain it against circumaxial movement. The only exception to this is the magnet located immediately adjacent the overlap 40 in the counterclockwise sense as viewed in FIG. 1, which magnet lacks a tab on its one end due to the presence of the opening 30 in the band. After the magnets are placed in position between the tabs 28, 28 of the annular band 27, the pole pieces 26, 26 are next placed in the relative positions shown in FIG. 1, with care being taken that the end faces 54, 54 of the adjacent pole pieces are arranged to diverge axially.

After the initial assembly of the annulus shown in FIGS. 1 and 2 is completed, the annulus series of pole pieces 26, 26 is expanded radially outwardly by axially driving or pressing wedges or wedge-like elements 60, 60 of nonmagnetic material between the adjacent end faces of adjacent pole pieces. FIGS. 4 and 5 show the annulus 20 with the wedges 60, 60 in place. The structure of the wedges employed in the annulus of FIGS. 4 and 6 is illustrated by the wedge 60 shown in detail in FIGS. 6 and 7; however, it should be understood that this wedge is shown and described by way of example only and that other wedge-like elements of somewhat different shape and size could be employed instead of those shown.

Referring to FIGS. 4, 5, 6 and 7, each illustrated wedge 60 includes a rectangular inner portion 62, a rectangular outer portion 64 and an intermediate portion 66. The two side surfaces 68, 68 of the intermediate portion diverge at an angle substantially equal to the angle of divergence between adjacent pole piece faces 54, 54. The rectangular portions 62 and 64 of each wedge extend laterally beyond the intermediate side surfaces 68, 68 so as to define grooves 70, 70 in the opposite sides of the wedge for receiving the end edge portions of the pole pieces, between which the wedges are fitted, and for holding the wedge in place on the pole pieces.

All of the wedges 60, 60 employed in the annulus of FIG. 4 may be pressed simultaneously into place between the associated end faces 54, 54, or, alternatively, may be driven in place one at a time. When placing a wedge between a pair of end faces it is, of course, so oriented that the side surfaces 68, 68 thereof diverge in the same direction as the end faces. The wedges do not necessarily have to be at the same axial location relative to the annulus and are deliberately made shorter than the pole pieces so that they may be driven to various axial positions without projecting beyond the bottom or top of the assembly. When the wedges 60, 60 are in place, the inner portions 62, 62 thereof project inwardly beyond the inner faces 48, 48 of the pole pieces, while the inner portions 64, 64 thereof project outwardly beyond the outer faces 46, 46.

It will be apparent from FIGS. 4 and 5 that the driving of the wedges between the divergent end faces of adjacent pole pieces will apply oppositely directed tangential forces to the respective end faces, which forces tend to circumaxially spread apart the pole pieces and to expand the annular series thereof radially outwardly. As the pole pieces are expanded outwardly they exert pressure against the inner faces 44, 44 of the magnets 24, 24, with the result that the magnets are clamped firmly between the annular band 27 and the pole pieces 26, 26. As a further result of the pressure exerted against the end faces of the pole pieces, and of the pressure exerted on the pole pieces by the magnets, the pole pieces and wedges form a continuous annular arch which is under compression throughout its entire extent, and the band 27, the magnets 24, 24, the pole pieces 26, 26 and the wedges 60, 60 are held together as a self-supporting annulus by this arch effect of the pole pieces and the wedges.

After the annulus 20 is formed into a self-supporting unit by the placement of the wedges 60, 60 it is thereafter placed in a die casting machine having a die with annular faces closely corresponding to the outer face of the band 27 and the inner faces 48, 48 of the pole pieces respectively. While the annulus is in the die, a nonmagnetic material 71, such as aluminum, is cast into and around it, making the annulus a rigid and sturdy unit after the die cast material hardens. The nonmagnetic material cast into the annulus forms an annular body which fills the empty spaces of the annulus, such as the spaces between adjacent magnets, the spaces between adjacent pole pieces, the spaces between the two shoe portions of each pole piece, and also the openings 72, 72 in the body of the annular band 27 left by the tabs 28, 28 when the latter are struck inwardly from the body of the band. The filling of the holes 72, 72 by the nonmagnetic material, and also the embedding of the tabs 28, 28 in the nonmagnetic material, serves to rigidly anchor the band 27 to the annulus 20 so that the latter will not come loose from the annulus, as might otherwise occur during subsequent machining operations which heat the band and apply axial forces thereto.

FIGS. 8, 9, 10 and 11 show the annulus 20 as it appears after the die casting operation. From these figures, it will be noted that, in addition to filling the empty spaces of the annulus with nonmagnetic material during the die casting operation, a continuous annular layer 74 of the nonmagnetic material 71 is cast over the tops of the magnets and the band to the level of the upper edge of the pole pieces 26, 26, and that additional material is cast adjacent the bottom of the annulus 20 to produce a continuous annular rim 76. The layer 74 and the rim 76 are, however, not essential to the invention and other different features could be die cast integral with the annulus to suit a particular flywheel structure. It is preferred, however, that the body of nonmagnetic material include at least one continuous annular portion on one side of the magnets so as to give added strength to the annulus by integrally uniting the portions of the nonmagnetic material filling the previously empty spaces of the annulus.

After the casting operation, the annulus 20 is ground or machined along the inner faces 48, 48 of the pole shoes 26, 26 to remove the inner portions 62, 62 of the wedges 60, 60 and also to remove any nonmagnetic casting material which is adhered to the inner faces of the pole shoes or which otherwise extends inwardly beyond the inner faces of the pole shoes. The pole shoes 26, 26 may also be machined or ground to some extent in this operation to produce a truly cylindrical surface concentric with the center axis of the annulus. In addition, the outer face of the annulus 20 is also ground or machined to remove therefrom any adherent nonmagnetic material and to expose the magnetic material of the annular band 27. Generally, the amount of nonmagnetic material on the outer face of the annulus is not of great radial thickness and is preferably removed by machining the outer face of the annulus with a thin skin cut. The annulus is thereafter completed by drilling and tapping the same at various locations to receive fasteners for holding it to the flywheel, although this step will not be necessary if the annulus is to be merely press-fitted into a flywheel. The completed annulus is shown in FIG. 12.

FIGS. 13 and 14 show the completed annulus 20 positioned in a flywheel 78 having a rim 80 formed of magnetic material and provided with a shallow recess bounded in part by a cylindrical surface 82 concentric with the flywheel axis. The outer surface of the annulus band 27 is approximately the same diameter as the flywheel surface 82 and the annulus is press-fitted into the rim 80 of the flywheel so that the outer surface of the band 27 tightly engages the surface 82. The rim 80, being made of magnetic material, provides, together with the magnetic band 27, a path for the flow of magnetic flux between adjacent magnets. In addition to the press-fit engagement between the annulus 20 and the rim 80, the annulus may also be mechanically held in place by means of screws 84.

The magnets 24, 24 are preferably uncharged prior to the assembly of the annulus with the flywheel since their proper magnetization requires that a suitable flux path between the magnets be provided and the annular band 27 is generally too thin to serve this purpose by itself. Therefore, after the annulus is assembled with the flywheel, it and the flywheel are placed in a suitable charging device which is effective to charge the magnets radially and in opposite directions so as to provide alternate north and south poles along the inner periphery of the annulus as described above.

As mentioned previously, the flywheel could be made integral with the rotor by forming the flywheel during th die casting operation. This could be accomplished by providing suitable dies having the required outline of the flywheel and casting the flywheel from the nonmagnetic material at the same time as the latter material is cast into the spaces of the annulus 20. In this case, however, the flywheel rim would carry little or no magnetic flux and therefore the annular restraining member 22 should have a larger cross-sectional area than the area of the illustrated band 27 so as to constitute a low reluctance path for the flow of magnetic flux between adjacent magnets.

FIGS. 15 and 16 relates to an alternative embodiment of the invention and show a rotor annulus 20a comprising a plurality of parts arranged in accordance with a method of this invention into an initial state of assembly. The annulus 20a is quite similar to that of FIG. 4, it having an outer restraining member 22 and a plurality of magnets 24, 24 identically arranged in a circumaxially spaced annular series within the annular member or band 22. Instead of a plurality of pole pieces as employed in the FIG. 4 assembly, however, this construction utilizes a single pole piece 26a of annular shape including a plurality (in the illustrated case eight) of shoe portions 50a, 50a integrally connected with one another by intermediate portions 52a, 52a. Each shoe portion 50a is generally similar to any one of the shoe portions 50, 50 shown in FIG. 4 and includes an outer face 46a which fits with and engages the inner face 44 of an associated magnet and also includes an inner cylindrical surface 48a concentric with the central axis of the annulus. In comparing the FIG. 15 annulus construction to that of FIG. 4, it will be noted that that of FIG. 15 is identical to that of FIG. 4 except for the use of additional intermediate portions 52a, 52a which replace all but one of the spaces present between adjacent pole pieces in FIG. 4. Therefore, in the FIG. 15 construction only a single wedge element 60 is required for spreading or enlarging the circumference of the pole piece to tighten the pole piece, the magnets and the annular band into a rigid unit preparatory to the die casting operation. As best shown in FIG. 16, the one space which is provided includes opposing inclined edges 54a, 54a on the associated pole shoes which inclined surfaces are similar to those shown at 54, 54 in FIG. 5. Following the assembly of the annulus 20a into the condition shown in FIGS. 15 and 16, it may be used in the same manner as the annulus 20 of FIG. 4 in the manufacture of a flywheel rotor.

It will also be obvious from FIGS. 4 and 15 that in addition to the constructions shown by these two figures, the illustrated pole shoes 50 or 50a could also be integrally connected into units of three or four or more pole shoes by intermediate portions such as 52 or 52a and that the number and arrangement of the pole pieces could be such as to require two or three or more wedge elements such as shown at 60.

In accordance with another alternative embodiment of the invention, any construction using more than one pole piece, such as the construction of FIG. 4 for example, any number but one of the wedge elements could be replaced by spacer elements having parallel rather than inclined grooves for receiving the ends of the associated shoe portions, the end faces on such shoe portions being accordingly parallel rather than inclined. One such spacer is shown at 61 in FIG. 17 wherein the associated adjacent pole shoes are indicated at 50b, 50b, the end faces of said pole pieces are shown at 54b, 54b and the parallel walls of the spacer are shown at 68b, 68b. In a construction employing one or more spacers such as shown in FIG. 17, the spacer or spacers are placed in the assembly prior to the insertion of the wedge. Thereafter, the wedge is inserted in place and driven home with the result that it in conjunction with the spacers and the pole pieces serve to radially expand the pole pieces to form the assembly into a rigid unit. It will of course be understood that the use of spacers does not limit the construction to the use of only one wedge and that instead the construction may be such as to use two or more wedges in conjunction with one or more spacers.

FIGS. 18–22, inclusive, show still another embodiment of the present invention. Turning first to FIGS. 18 and 19, these figures show a rotor annulus 20c which comprises a plurality of separate parts arranged into an initial state of assembly similar to that of the annulus 20 of FIG. 4. The illustrated annulus 20c is in all respects similar to that of FIG. 4 except for including a different form of outer annular restraining member. In FIGS. 18 and 19 this outer annular restraining member is shown at 22c and constitutes a relatively thick walled band of magnetic material, such as iron or steel, which may be made from a section cut from a piece of thick walled iron or steel tubing. Referring to FIG. 19, the annular band 22c also differs from the band 22 of FIG. 4 in that it extends axially in either direction beyond the magnets 24, 24. Also, as best shown in FIG. 19, the inside surface of the band 22c is machined or otherwise formed to provide two annular grooves 23, 23 each of which is located adjacent a respective one of the two radial planes between which the magnets are located and each of which grooves extends axially some distance in the direction away from the magnets. The outside surface of the band 22c is also machined or otherwise formed to provide a reduced diameter portion 90 and a larger diameter portion 92 separated by a radial shoulder 94.

In the partially completed annulus shown in FIG. 18, the outer band 22c, the magnets 24, 24 and the pole pieces 26, 26 are held assembled in the same manner as the parts of the partially completed annulus of FIG. 4 by a plurality of wedges 60, 60 which are driven into the spaces between adjacent pole pieces. From FIG. 19 it will be noted that the outer band 22c extends downwardly below the lower radial plane containing the lower side faces of the magnets 24, 24 and the associated ends of the pole pieces 26, 26. The annulus is therefore preferably assembled into the condition of FIGS. 18 and 19 by use of a table or jig having one annular surface for supporting the lower face of the band 22c and another raised annular surface for supporting the magnets 24, 24 and the pole pieces 26, 26. After the annulus 20c is assembled into the condition shown in FIGS. 18 and 19 its manufacture is thereafter continued by placing the same in suitable dies and die casting a suitable non-magnetic material into the otherwise empty spaces occurring between the outer band and the inner faces 48, 48 of the polye shoes. As shown in FIG. 20 a layer 76c of the same material is also cast around the bottom of the magnets 24 and another layer 74c is also cast around the top of the magnets. The two layers 74c and 76c are integral with the other die cast material in the annulus and include portions which extend into the grooves 23, 23 so as to firmly secure the outer band 22c and all other parts of the annulus in assembled relationship with each other. After the diecasting operation, the inner surface of the annulus may be machined or ground in the same manner as discussed in connection with the first embodiment of the invention to remove the inwardly protruding portions of the wedges 60, 60 and to remove any excess die cast material adhering to the pole shoes, this same operation also providing the annulus with an inner surface truly concentric with the central axis.

The use of the thick walled outer band 22c provides a low reluctance flux path for the flow of flux between the the radially outer poles of the magnets 24, 24 and eliminates the need for an additional flux carrying member such as the rim 80 of the flywheel shown in FIGS. 13 and 14. The annulus 20c may therefore be used in the construction of a flywheel type rotor wherein the outer band 22c constitutes the flywheel rim. Such a construction is shown in FIGS. 21 and 22 wherein it will be noted that the illustrated flywheel constitutes the annulus 20c attached to another part comprising a hub 96 integral with a radial web 98 to which the annulus 20c is attached as shown by means of a plurality of screws 84c. The flywheel shown in FIGS. 21 and 22 also includes an annular ring gear 100 on the rim of the flywheel which ring gear is attached to the outer band 22b with its inside surface received on the reduced diameter portion 90 of the band 22c with one of its side faces engaged with the radial shoulder 94. Since the outer band 22c provides a low reluctance path for the flow of magnetic flux between the radially outer faces of the magnets, it will be apparent that, if desired, the magnets in the annulus may be charged prior to the assembly of the hub and web member with the annulus.

The invention claimed is:

1. A multimagnet annulus for use in the manufacture of an electric generator, said annulus comprising a plurality of permanent magnets arranged in a circumaxially spaced annular series about a central axis and having radially inner and radially outer faces, restraining means surrounding said series of magnets and limiting the outward radial movement thereof, a plurality of pole shoes arranged in an annular series within said series of magnets with each of said pole shoes having an outer face engaging the inner face of a respective one of said magnets and having a generally arcuate inner face tangent to a common circle concentric with said central axis, said pole shoes being circumaxially spaced apart and at least one of said shoes being integrally connected with an adjacent shoe by an intermediate portion extending circumaxially therebetween and having a cross sectional area substantially smaller than that of said shoes, and separate elements disposed in the circumaxially extending spaces between other adjacent pole shoes, at least one of said separate elements comprising a wedge adapted to engage the two pole shoes between which it is received and to cooperate therewith when moved in one direction to circumferentially spread and radially expand said pole shoes to form said pole shoes and said separate elements into a continuous circular arch which is under compression throughout its entire length and which bears outwardly against said magnets to hold the latter in place between said pole shoes and said restraining means.

2. An annulus as defined in claim 1 further characterized by said wedge having two surfaces mutually inclined in the axial direction and the two pole shoes between which said wedge is received having two corresponding inclined end faces engaging said two wedge surfaces so that said wedge when forced in an axial direction between said latter end faces serves to circumferentially spread said two associated pole shoes.

3. An annulus as defined in claim 2 further characterized by said separate elements each having two generally axially extending groves therein for receiving the end edge portions of the two associated adjacent pile shoes so as to prevent said pole shoes from moving radially relatively to each other prior to said at least one wedge being moved axially to tighten said pole shoes and separate elements into a continuous arch.

4. An annulus as defined in claim 3 further characterized by said separate elements including portions which extend radially inwardly beyond said inner arcuate faces of said pole shoes.

5. A multimagnet annulus for use in the manufacture of an electric generator which annulus is obtained by removing the radially inwardly extending portions of the separate elements from an annulus as defined in claim 4 after said at least one wedge is moved axially to tighten said pole shoes and separate elements into a continuous arch.

6. A multimagnet annulus for use in the manufacture of an electric generator which annulus is obtained by taking an annulus as defined in claim 4, casting nonmagnetic material into the empty spaces remaining in the area between said restraining means and the inner faces of said pole shoes, and thereafter removing said inwardly extending portions of said separate elements.

7. An annulus as defined in claim 1 further characterized by a plurality of circumaxially spaced abutments on said restraining means and extending inwardly therefrom into respective engagement with the circumaxially spaced ends of said magnets.

8. An annulus as defined in claim 7 further characterized by said restraining means comprising a radially thin annular band and said abutments comprising tabs cut and bent radially inwardly from the body of said band, a nonmagnetic material filling the otherwise empty spaces in the area between said annular band and the inner faces of said pole shoes and which empty spaces include the openings in said band produced by the formation of said tabs.

9. A multimagnet annulus for use in the manufacture of an electric generator, said annulus comprising a plurality of permanent magnets arranged in a circumaxially spaced annular series about a central axis and having radially inner and radially outer faces, restraining means surrounding the outer faces of said magnets to limit the outward radial movement thereof, a plurality of pole shoes arranged in an annular series within said series of magnets with each of said pole shoes having an outer face engaging the inner face of a respective one of said magnets and having a generally arcuate inner face tangent to a common circle concentric with said central axis, said pole shoes being circumaxially spaced apart and joined together to form an integral annular pole piece unit by a plurality of intermediate portions extending circumaxially between adjacent pole shoes and each of which intermediate portions has a cross sectional area substantially smaller than that of said pole shoes, said intermediate portions being provided between all but one pair of said pole shoes, and a wedge element disposed between said one pair of shoes and cooperating therewith to circumferentially spread said one pair of pole shoes to radially expand said annular pole piece and thereby cause said pole shoes to bear outwardly against said magnets to hold the latter in place between said pole shoes and said restraining means.

10. A rotor for an electric generator, said rotor comprising a plurality of permanent magnets arranged in a circumaxially spaced series, each of said magnets having a radially inner and a radially outer face and alternate magnets of the series being radially charged in opposite directions, means magnetically connecting said radially outer faces of said magnets, a plurality of pole shoes of magnetic material arranged adjacent said series of magnets with each of said pole shoes having a radially outer face engaging the inner face of a respective one of said magnets and having a generally arcuate inner face tangent to a common circle concentric with said central axis, and means interposed between said shoes to cause them to be circumaxially spaced apart and at least one of said shoes being integrally connected with an adjacent shoe by an intermediate portion extending circumaxially therebetween and having a cross sectional area substantially smaller than that of said shoes.

11. A multimagnet annulus for assembly with a generator flywheel having a rim provided with a shallow recess therein bounded in part by a cylindrical surface concentric with the flywheel axis, said annulus comprising, an annular restraining member formed of magnetic material and having an external diameter approximately that of said cylindrical flywheel surface so that said member may be entered within said flywheel rim recess with the outer surface of the member in close proximity throughout its entire circumferential length with said surface, a plurality of radially chargeable permanent magnets arranged in an annular series within said restraining member, a plurality of circumferentially spaced abutments carried by said restraining member and extending inwardly therefrom into respective engagement with the ends of said magnets to locate and hold the latter against circumferential displacement, a plurality of pole pieces arranged in an annular series within said annular series of magnets, which pole pieces have their adjacent ends circumaxially spaced apart, and a body of nonmagnetic material which fills the spaces between said magnets and said pole pieces and has at least one continuous annular portion at one side of the magnets, said abutments being embedded in said body of nonmagnetic material so as to firmly anchor said restraining member against axial displacement relative to the other parts of said annulus.

12. A multimagnet annulus for assembly with a generator flywheel having a rim provided with a shallow recess therein bounded in part by a cylindrical surface concentric with the flywheel axis, said annulus comprising, an annular restraining member formed of magnetic material and having an external diameter approximating that of said cylindrical flywheel surface so that said member may be entered within said flywheel rim recess with the outer surface of the member in close proximity throughout its entire circumferential length with said surface, a plurality of radially chargeable permanent magnets arranged in an annular series within said restraining member, a plurality of circumferentially spaced abutments carried by said restraining member and extending inwardly therefrom into respective engagement with the ends of said magnets to locate and hold the latter against circumferential displacement, a plurality of pole pieces arranged in an annular series within said annular series of magnets, and means for urging the adjacent ends of adjacent pole pieces circumaxially apart with the result that said pole pieces are urged radially outwardly to clamp said magnets between said pole pieces and said circular restraining member and with the further result that said restraining member, said magnets, said pole pieces and said last-mentioned means are held in fixed relationship with each other and form a self-supporting unit.

13. A multimagnet annulus for the rotor of an electric generator, said annulus comprising a plurality of permanent magnets arranged in a circumaxially spaced annular series about a central axis and having inner faces concentric with said central axis, alternate magnets of said series being radially chargeable in opposite directions so that the inner faces of immediately adjacent magnets constitute a pair of north and south poles and so that the north poles alternate with the south poles around the surface circumscribed by the inner faces of said magnets to provide circumaxially spaced pairs of north and south poles, a plurality of pole pieces arranged in an annular series within said series of magnets and respectively engaging and fitting the inner faces of the two adjacent magnets comprising a pair of adjacent north and south poles, each pole piece having a portion of reduced cross section located circumaxially between the inner faces of the associated pair of magnets which portion provides a path for the flow of a limited amount of magnetic flux between the associated pair of magnets, the adjacent ends of adjacent pole pieces being circumaxially spaced apart, and means for holding said magnets and pole pieces in fixed relationship to each other.

14. In a multimagnet annulus for an electric generator, the combination of a plurality of permanent magnets arranged in an annular series and circumaxially spaced to provide spaces between the adjacent ends of adjacent magnets, alternate magnets of said series being radially chargeable in opposite directions, and a plurality of pole pieces arranged in an annular series within said series of magnets, said pole pieces respectively being of such circumaxial length and so arranged as to circumaxially span the inner faces of two adjacent magnets, each pole piece comprising two shoe portions of large cross sectional area which shoe portions fit and engage respectively the inner faces of the two adjacent magnets associated with the pole piece and an intermediate portion of reduced cross sectional area which serves to mechanically connect said two shoe portions and to provide a magnetic path for the leakage of some magnetic flux between said two shoe portions, said intermediate portion being circumaxially located between the two adjacent magnets associated with the pole piece and in alignment with the space between the adjacent ends of said magnets, and means for holding said magnets and pole pieces in fixed relationship to each other.

15. A multimagnet annulus for an electric generator, said annulus comprising a plurality of similar permanent magnets arranged in a circumaxially spaced annular series and having arcuate inner faces tangent to a common circle having a central axis, alternate magnets of the series being radially chargeable in opposite directions, restraining means engaging and fitting the outer faces of said magnets and limiting the outward radial movement thereof, a plurality of arcuate pole pieces arranged in an annular series within said series of magnets, said pole pieces having outer faces engaging and fitting the inner faces of said magnets, inner faces tangent to a common circle concentric with said central axis, and end faces, the adjacent end faces of adjacent pole pieces being circumaxially spaced apart and divergent in one axial direction so as to be more closely spaced on one side of said pole pieces than on the other side, and a plurality of nonmagnetic wedge-like elements in axially forced engagement with the pairs of adjacent end faces, each pair of adjacent end faces having associated therewith a respective one of said wedge-like elements with the result that said pole pieces and said elements form a continuous circular arch which is under compression throughout its entire length and which bears outwardly against said magnets to hold the latter in place.

16. A multimagnet annulus for an electric generator, said annulus comprising a plurality of similar permanent magnets arranged in a circumaxially spaced annular series and having arcuate inner faces tangent to a common circle having a central axis, alternate magnets of the series being radially chargeable in opposite directions, restraining means engaging and fitting the outer faces of said magnets and limiting the outward radial movement thereof, a plurality of arcuate pole pieces arranged in an annular series within said series of magnets, said pole pieces having outer faces engaging and fitting the inner faces of said magnets, inner faces tangent to a common circle concentric with said central axis, and end faces, the adjacent end faces of adjacent pole pieces being circumaxially spaced apart and divergent in one axial direction so as to be more closely spaced on one side of said pole pieces than on the other side, and a plurality of nonmagnetic wedges having diverging surfaces corresponding to the divergence between adjacent pole piece end faces and located between adjacent pole piece end faces with said diverging surfaces in respective forced engagement with the associated end faces and diverging in the same axial direction as said end faces, each pair of adjacent end faces having associated therewith a respective one of said wedgelike elements with the result that said pole pieces and said elements form a continuous circular arch which is under compression throughout its entire length and which bears outwardly against said magnets to hold the latter in place.

References Cited by the Examiner

UNITED STATES PATENTS

| | | | |
|---|---|---|---|
| 3,077,026 | 2/1963 | Blackburn | 29—155.53 |
| 3,121,814 | 2/1964 | Kober | 310—156 |
| 3,132,270 | 5/1964 | Phelon | 310—156 |
| 3,173,194 | 3/1965 | Applegate | 29—155.55 |

MILTON O. HIRSHFIELD, *Primary Examiner.*

JOHN F. COUCH, ORIS L. RADER, *Examiners.*

J. W. GIBBS, *Assistant Examiner.*